(12) United States Patent
Jung et al.

(10) Patent No.: US 11,614,252 B2
(45) Date of Patent: Mar. 28, 2023

(54) AIR CONDITIONER AND PIPE SEARCH METHOD THEREFOR

(71) Applicant: LG Electronics Inc., Seoul (KR)

(72) Inventors: Jaehwa Jung, Seoul (KR); Yongcheol Sa, Seoul (KR)

(73) Assignee: LG Electronics Inc., Seoul (KR)

( * ) Notice: Subject to any disclaimer, the term of this patent is extended or adjusted under 35 U.S.C. 154(b) by 364 days.

(21) Appl. No.: 16/875,187

(22) Filed: May 15, 2020

(65) Prior Publication Data

US 2020/0363090 A1    Nov. 19, 2020

(30) Foreign Application Priority Data

May 17, 2019    (KR) .......................... 10-2019-0058403

(51) Int. Cl.
*F24F 11/00* (2018.01)
*F16L 55/09* (2006.01)
*F24F 11/70* (2018.01)

(52) U.S. Cl.
CPC .............. *F24F 11/70* (2018.01); *F16L 55/09* (2013.01); *F16L 2201/60* (2013.01)

(58) Field of Classification Search
CPC .................................. F24F 11/70; F16L 55/09
See application file for complete search history.

(56) References Cited

U.S. PATENT DOCUMENTS

| 2009/0049850 | A1 | 2/2009 | Kim et al. |
| 2012/0006436 | A1 | 1/2012 | Morimoto et al. |
| 2012/0031605 | A1 | 2/2012 | Takayama et al. |
| 2012/0285655 | A1 | 11/2012 | Lee et al. |
| 2013/0305758 | A1 | 11/2013 | Matsui |

FOREIGN PATENT DOCUMENTS

| EP | 1643193 | | 4/2006 |
| EP | 2284456 | | 2/2011 |
| KR | 20080060760 | * | 7/2008 |
| KR | 100861598 | | 10/2008 |
| KR | 20110073707 | * | 6/2011 |

OTHER PUBLICATIONS

PCT International Search Report in International Appln. No. PCT/KR2020/005116, dated Jul. 15, 2020, 3 pages.
Extended European Search Report in European Application No. 20174995.9, dated Oct. 15, 2020, 4 pages.

* cited by examiner

*Primary Examiner* — Mark A Connolly
(74) *Attorney, Agent, or Firm* — Fish & Richardson P.C.

(57) ABSTRACT

An air conditioner includes an outdoor unit for circulating refrigerant, a plurality of indoor units for circulating water, and a heat exchange device configured to connect the outdoor unit to the plurality of indoor units and perform heat exchange between the refrigerant and the water. The heat exchange device includes a plurality of ports to which the plurality of indoor units are connected. The air conditioner further includes a controller configured to control flow of the water between the heat exchange device and the plurality of indoor units, and to search pipes respectively connected to the plurality of ports. The controller can control the flow of water such that water at a first temperature flows to some of the plurality of ports and the water at a second temperature lower than the first temperature flows to other some of the plurality of ports.

19 Claims, 7 Drawing Sheets

FIG. 3

| Type \ Number of times | 1 | 2 |
|---|---|---|
| First indoor unit | High temperature water | Low temperature water |
| Second indoor unit | High temperature water | High temperature water |
| Third indoor unit | Low temperature water | High temperature water |
| Fourth indoor unit | Low temperature water | Low temperature water |

(a)

| Type \ Number of times | 1 | 2 |
|---|---|---|
| First indoor unit | High temperature water | Intermediate temperature water |
| Second indoor unit | High temperature water | High temperature water |
| Third indoor unit | Intermediate temperature water | High temperature water |
| Fourth indoor unit | Intermediate temperature water | Intermediate temperature water |

(b)

AIR CONDITIONER AND PIPE SEARCH METHOD THEREFOR

CROSS-REFERENCE TO RELATED APPLICATIONS

Pursuant to 35 U.S.C. § 119 (e), this application claims the benefit of Korean Patent Applications No. 10-2019-0058403, filed on May 17, 2019, the contents of which are all hereby incorporated by reference herein in its entirety.

TECHNICAL FIELD

The present disclosure relates to an air conditioner and a pipe search method for the air conditioner.

BACKGROUND

An air conditioner operates to keep air in a condition suitable for preset use and purpose in a space. In general, the air conditioner includes a compressor, a condenser, an expansion device, and an evaporator, and drives a cooling cycle that performs compression, condensation, expansion, and evaporation of refrigerant to cool or heat a predetermined space. The predetermined space may be variously defined depending on where the air conditioner is placed. For example, the predetermined space may be a house or an office.

When the air conditioner performs a cooling operation, an outdoor heat exchanger provided in an outdoor unit functions as a condenser and an indoor heat exchanger provided in an indoor unit functions as an evaporator. On the other hand, when the air conditioner performs a heating operation, the indoor heat exchanger functions as a condenser and the outdoor heat exchanger functions as an evaporator.

The air conditioner may be classified into a single type air conditioner and a multi-type air conditioner according to the number of indoor units connected. In the single-type air conditioner, one indoor unit is connected to the outdoor unit. In the multi-type air conditioner, a plurality of indoor units are connected to the outdoor unit.

The multi-type air conditioner includes a distributor that distributes refrigerant to a plurality of indoor units. The multi-type air conditioner may include a plurality of distributors when there are a large number of indoor units. In this case, a plurality of valves are disposed in each of the distributors, a pipe is connected to each valve, and an indoor unit is connected to each pipe.

After the air conditioner is installed in a building, a test operation is first performed before normal operation is performed. During the test operation of the air conditioner, a pipe search operation can be performed to search for which indoor unit each pipe is connected to.

Some pipe search methods include a group search step of searching for which distributor each indoor unit group is connected to by sequentially operating indoor unit groups connected to distributors and detecting the indoor unit group that is operated, and an individual search step of searching for which pipe of the corresponding distributor each indoor unit is connected to by sequentially operating the indoor units in each of the indoor unit groups and detecting the indoor unit that is operated.

In such pipe search methods, while some indoor units are operated in a cooling mode and some other indoor units are operated in a heating mode, pipes are searched for based on a change in temperature of the indoor units. However, in these pipe search method, when the indoor unit is operated in the cooling mode with an indoor temperature being low, a search error can occur because the pipe temperature of the indoor unit is similar to the indoor temperature during the initial cooling operation. Therefore, it is difficult to shorten the pipe search time the indoor unit needs to be operated in the cooling mode after the indoor unit is operated in a heating mode.

SUMMARY

Implementations of the present disclosure provide an air conditioner and a pipe search method therefor which improve pipe search accuracy while reducing a pipe search time.

Implementations of the present disclosure provide an air conditioner and a pipe search method therefor which accurately perform pipe search even when an indoor temperature is low.

Particular implementations of the present disclosure described herein provide an air conditioner that includes an outdoor unit, a plurality of indoor units, a heat exchanger, and a controller. The outdoor unit may be configured to circulate refrigerant. The plurality of indoor units may be configured to circulate fluid. The heat exchanger may fluidly connect the outdoor unit to the plurality of indoor units and be configured to transfer heat between the refrigerant and the fluid. The heat exchanger may include a plurality of ports that fluidly connect to the plurality of indoor units through a plurality of pipes. The controller may be configured to control flow of the fluid between the heat exchanger and the plurality of indoor units. The controller may be configured to permit the fluid that is at a first temperature to flow to a first subset of the plurality of ports, permit the fluid that is at a second temperature to flow to a second subset of the plurality of ports, the second temperature being lower than the first temperature, and identify fluidic connection between at least one of the plurality of pipes and at least one of the plurality of ports based on the flow of the fluid that is at the first temperature and the flow of the fluid that is at the second temperature.

In some implementations, the air conditioner described herein can optionally include one or more of the following features. The controller may be configured to classify at least some of the plurality of ports to a first group of ports and a second group of ports. The fluid that is at the first temperature flows through the first group of ports, and the fluid that is at the second temperature flows through the second group of ports. The controller may be configured to permit the fluid that is at the first temperature to flow to a first subset of the first group of ports, and permit the fluid that is at the second temperature to flow to a second subset of the first group of ports. The controller may be configured to match first and second ports in the first group of ports with first and second indoor units by distinguishing the first port from the second port. The fluid that is at the first temperature flows through the first port, and the fluid that is at the second temperature flows through the second port. The controller may be configured to permit the fluid that is at the first temperature to flow to a first subset of the second group of ports, and permit the fluid that is at the second temperature to flow to a second subset of the second group of ports. The controller may be configured to match third and fourth ports in the second group of ports with third and fourth indoor units by distinguishing the third port from the fourth port. The fluid that is at the first temperature flows through the third port, and the fluid that is at the second temperature flows through the fourth port. The controller may be configured to, based on an indoor temperature being higher than or equal to a reference temperature, permit the fluid that is at the first temperature to flow to the first subset of the plurality of ports and permit the fluid that is at the second temperature to the second subset of the plurality of ports. The controller may be configured to, based on the indoor temperature being lower than the reference temperature, permit the fluid that is at the first temperature flows to the first subset of the plurality of ports and permit the fluid that is at a third temperature to the second subset of the plurality of ports. The third temperature may be between the first temperature and the second temperature. The controller may be configured to classify at least some of the plurality of ports to a first group of ports and a second group of ports. The fluid that is at the first temperature flows through the first group of ports, and wherein the fluid that is at the third temperature flows through the second group of ports. The controller may be configured to permit the fluid that is at the first temperature to flow to a first subset of the first group of ports, and permit the fluid that is at the third temperature to flow to a second subset of the first group of ports. The controller may be configured to match first and second ports in the first group of ports with first and second indoor units by distinguishing the first port from the second port. The fluid that is at the first temperature flows through the first port, and the fluid that is at the third temperature flows through the second port. The controller may be configured to permit the fluid that is at the first temperature to flow to a first subset of the second group of ports, and permit the fluid that is at the third temperature to flow to a second subset of the second group of ports. The controller may be configured to match third and fourth ports in the second group of ports with third and fourth indoor units by distinguishing the third port from the fourth port. The fluid that is at the first temperature flows through the third port, and the fluid that is at the third temperature flows through the fourth port. The heat exchanger may includes a first fluid inlet pipe and a second fluid inlet pipe that allow the fluid to flow into each indoor unit, a first valve configured to control fluid flow in the first fluid inlet pipe, and a second valve configured to control fluid flow in the second fluid inlet pipe. The controller may be configured to open the first valve and close the second valve to permit the fluid that is at the first temperature to flow into the indoor unit, open the second valve and close the first valve to permit the fluid that is at the second temperature to flow into the indoor unit, and open the first valve and the second valve to permit the fluid that is at the third temperature to flow into the indoor unit.

Particular implementations of the present disclosure described herein provide a pipe search method for an air conditioner. The air conditioner may include an outdoor unit, a plurality of indoor units, a heat exchanger, and a controller. The outdoor unit may be configured to circulate refrigerant. The plurality of indoor units may be configured to circulate fluid. The heat exchanger may fluidly connect the outdoor unit to the plurality of indoor units and be configured to transfer heat between the refrigerant and the fluid. The heat exchanger may include a plurality of ports that fluidly connect to the plurality of indoor units through a plurality of pipes. The controller may be configured to control flow of the fluid between the heat exchanger and the plurality of indoor units. The pipe search method may include allowing the fluid that is at a first temperature to flow into a first subset of the plurality of ports; allowing the fluid that is at a second temperature lower than the first temperature to flow into a second subset of the plurality of ports; classifying at least some of the plurality of ports to a first group of ports and a second group of ports, wherein the fluid that is at the first temperature flows through the first group of ports, and wherein the fluid that is at the second temperature flows through the second group of ports; allowing the fluid that is at the first temperature to flow into a first subset of the first group of ports; allowing the fluid that is at the second temperature to flow into a second subset of the first group of ports; allowing the fluid that is at the first temperature to flow into a first subset of the second group of ports; and allowing the fluid that is at the second temperature to flow into a second subset of the second group ports.

In some implementations, the pipe search method described herein can optionally include one or more of the following features. The controller may be configured to match first and second ports in the first group of ports with first and second door units by distinguishing the first port from the second port. The fluid that is at the first temperature flows through the first port, and the fluid that is at the second temperature flows through the second port. The controller may be configured to match third and fourth ports in the second group of ports with third and fourth door units by distinguishing the third port from the fourth port. The fluid that is at the first temperature flows through the third port, and the fluid that is at the second temperature flows through the fourth port.

Particular implementations of the present disclosure described herein provide a pipe search method for an air conditioner. The air conditioner may include an outdoor unit, a plurality of indoor units, a heat exchanger, and a controller. The outdoor unit may be configured to circulate refrigerant. The plurality of indoor units may be configured to circulate fluid. The heat exchanger may fluidly connect the outdoor unit to the plurality of indoor units and be configured to transfer heat between the refrigerant and the fluid. The heat exchanger may include a plurality of ports that fluidly connect to the plurality of indoor units through a plurality of pipes. The controller may be configured to control flow of the fluid between the heat exchanger and the plurality of indoor units. The pipe search method may include detecting an indoor temperature; based on the indoor temperature being higher than or equal to a reference temperature, allowing the fluid that is at a first temperature to flow into a first subset of the plurality of ports, and allowing the fluid that is at a second temperature lower than the first temperature flows into a second subset of the plurality of ports; and based on the indoor temperature being lower than the reference temperature, allowing the fluid that is at the first temperature to flow into a third subset of the plurality of ports and allowing the fluid that is at a third temperature to flow into a fourth subset of the plurality of ports, the third temperature being between the first temperature and the second temperature.

In some implementations, the air conditioner described herein can optionally include one or more of the following features. The controller may be configured to classify at least some of the plurality of ports to a first group of ports and a second group of ports. The fluid that is at the first temperature flows through the first group of ports, and the fluid that is at the third temperature flows through the second group of ports. The controller may be configured to permit the fluid that is at the first temperature to flow into a first subset of the first group of ports; permit the fluid that is at the third temperature to flow into a second subset of the first group of ports; permit the fluid that is at the first temperature to flow into a first subset of the second group of ports; and permit the fluid that is at the third temperature to flow into a second subset of the second group of ports. The controller may be configured to match first and second ports in the first group of ports with first and second indoor units by distinguishing the first port from the second port. The fluid that is at the first temperature flows through the first port, and the fluid that is at the third temperature flows through the second port. The controller may be configured to match third and fourth ports in the second group of ports with third and fourth indoor units by distinguishing the third port from the fourth port. The fluid that is at the first temperature flows through the third port, and the fluid that is at the third temperature flows through the fourth port. The controller may be configured to classify at least some of the plurality of ports to a first group of ports and a second group of ports. The fluid that is at the first temperature flows through the first group of ports, and the fluid that is at the second temperature flows through the second group of ports. The controller may be configured to permit the fluid that is at the first temperature flows into a first subset of the first group of ports, permit the fluid that is at the second temperature flows into a second subset of the first group of ports, permit the fluid that is at the first temperature flows into a first subset of the second group of ports, and permit the fluid that is at the second temperature flows into a second subset of the second group of ports. The controller may be configured to match first and second ports in the first group of ports with first and second indoor units by distinguishing the first port from the second port. The fluid that is at the first temperature flows through the first port, and the fluid that is at the second temperature flows through the second port. The controller may be configured to match third and fourth ports in the second group of ports with third and fourth indoor units. The fluid that is at the first temperature flows through the third port, and the fluid that is at the second temperature flows through the fourth port.

In accordance with an aspect, an air conditioner includes an outdoor unit through which refrigerant circulates; a plurality of indoor units through which water circulates; a heat exchange device configured to connect the outdoor unit to the plurality of indoor units and perform heat exchange between the refrigerant and the water and including a plurality of ports to which the plurality of indoor units are connected, and a controller configured to control flow of the water between the heat exchange device and the plurality of indoor units.

To search pipes respectively connected to the plurality of ports, the controller may control the flow of water such that water at a first temperature flows to some of the plurality of ports and the water at a second temperature lower than the first temperature flows to other some of the plurality of ports.

The controller may group ports, through which water at a first temperature flows, into a first group and group ports, through which water at a second temperature flows, into the second group.

The controller may control flow of water such that the water at the first temperature flows to some of the ports of the first group, and the water at the second temperature flows to other some of the ports of the first group.

The controller may match the ports with the indoor units while distinguishing the port through which the water at the first temperature flows and the port through which the water at the second temperature flows in the first group.

The controller may control flow of water such that the water at the first temperature flows to some of the ports of the second group, and the water at the second temperature flows to other some of the ports of the second group.

The controller may match the ports with the indoor units in a state of distinguishing the port through which the water at the first temperature flows and the port through which the water at the second temperature flows in the second group.

To search pipes respectively connected to the plurality of ports, the controller may control the flow of water such that water at a first temperature flows to some of the plurality of ports and the water at a second temperature lower than the first temperature flows to other some of the plurality of ports when an indoor temperature is higher than or equal to a reference temperature, and when an indoor temperature is lower than the reference temperature, the controller may control the flow of water such that the water at the first temperature flows to some of the plurality of ports and water at a third temperature of between the first temperature and the second temperature flows to other some of the plurality of ports.

The controller may group ports, through which water at the first temperature flows, into a first group and group ports, through which the water at the third temperature flows, into a second group.

The controller may control flow of water such that the water at the first temperature flows to some of the ports of the first group, and the water at the third temperature flows to other some of the ports of the first group.

The controller may match the ports with the indoor units while distinguishing the port through which the water at the first temperature flows and the port through which the water at the third temperature flows in the first group.

The controller controls flow of water such that the water at the first temperature flows to some of the ports of the second group, and the water at the third temperature flows to other some of the ports of the second group.

The controller may match the ports with the indoor units while distinguishing the port through which the water at the first temperature flows and the port through which the water at the third temperature flows in the second group.

The heat exchange device may include a first water inlet pipe and a second water inlet pipe arranged in parallel to allow water to flow into each indoor unit, a first valve configured to control water flow in the first water inlet pipe, and a second valve configured to control water flow in the second water inlet pipe.

The controller may open the first valve and closes the second valve when the water at the first temperature is allowed to flow into the indoor unit, open the second valve and closes the first valve when the water at the second temperature is allowed to flow into the indoor unit, and open the first valve and the second valve when the water at the third temperature is allowed to flow into the indoor unit.

In accordance with another aspect, a pipe search method for an air conditioner includes allowing water at a first temperature to flow into some of the plurality of ports and allowing water at a second temperature lower than the first temperature to flow into other some of the plurality of ports, grouping ports, through which the water at the first temperature flows, into a first group and grouping ports, through which the water at the second temperature flows, into a second group, and allowing the water at the first temperature to flow into some of the ports of the first group, allowing water at the second temperature to flow into other some of the ports of the first group, allowing the water at the first temperature to flow into some of the ports of the second group and allowing water at the second temperature to flow into other some of the ports of the second group.

The controller may match the ports with the indoor units in a state of distinguishing the port through which the water at the first temperature flows and the port through which the water at the second temperature flows in the first group, and the controller may match the ports with the indoor units in a state of distinguishing the port through which the water at the first temperature flows and the port through which the water at the second temperature flows in the second group.

In accordance with another aspect, a pipe search method for an air conditioner includes detecting an indoor temperature; determining a temperature of water for pipe search based on the detected indoor temperature; allowing water at a first temperature to flow into some of the plurality of ports and allowing water at a second temperature lower than the first temperature flows into other some of the plurality of ports when an indoor temperature is higher than or equal to a reference temperature, and allowing the water at the first temperature to flow into some of the plurality of ports and allowing water at a third temperature of between the first temperature and the second temperature to flow into others of the plurality of ports when an indoor temperature is lower than the reference temperature.

The controller may group ports, through which the water at the first temperature flows, into a first group and grouping ports, through which the water at the third temperature flows, into a second group, and thereafter, the controller may control water flow such that the water at the first temperature flows into some of the ports of the first group and the water at the third temperature flows into other some of the ports of the first group, controls water flow such that the water at the first temperature flows into some of the ports of the second group and the water at the third temperature flows into other some of the ports of the second group.

The controller may match the ports with the indoor units while distinguishing the port through which the water at the first temperature flows and the port through which the water at the third temperature flows in the first group, and match the ports with the indoor units while distinguishing the port through which the water at the first temperature flows and the port through which the water at the third temperature flows in the second group.

The controller may group ports, through which the water at the first temperature flows, into a first group and grouping ports, through which the water at the second temperature flows, into a second group, and thereafter, the controller may control water flow such that the water at the first temperature flows into some of the ports of the first group and the water at the second temperature flows into other some of the ports of the first group, controls water flow such that the water at the first temperature flows into some of the ports of the second group and the water at the second temperature flows into other some of the ports of the second group.

The controller matches the ports with the indoor units in a state of distinguishing the port through which the water at the first temperature flows and the port through which the water at the second temperature flows in the first group, and match the ports with the indoor units in a state of distinguishing the port through which the water at the first temperature flows and the port through which the water at the second temperature flows in the second group.

BRIEF DESCRIPTION OF THE DRAWINGS

FIG. 3 is a diagram showing example temperatures of water flowing to each indoor unit for each number of times of pipe search.

DETAILED DESCRIPTION OF THE IMPLEMENTATIONS

Hereinafter, some implementations of the present disclosure will be described in detail with reference to the exemplary drawings.

Figure 1:
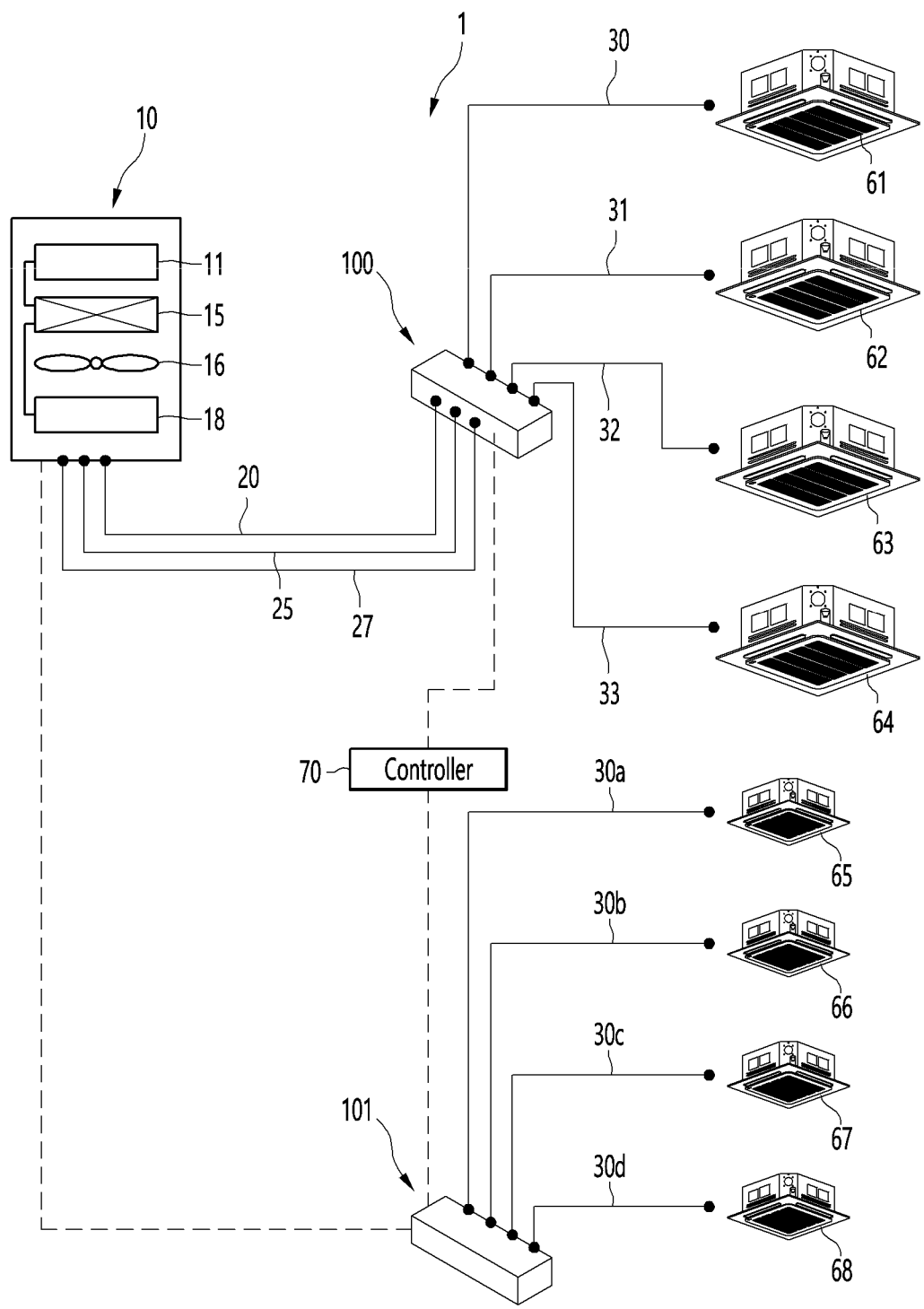
FIG. 1 is a perspective view showing an example configuration of an air conditioner according to some implementations of the present disclosure.
Figure 2:
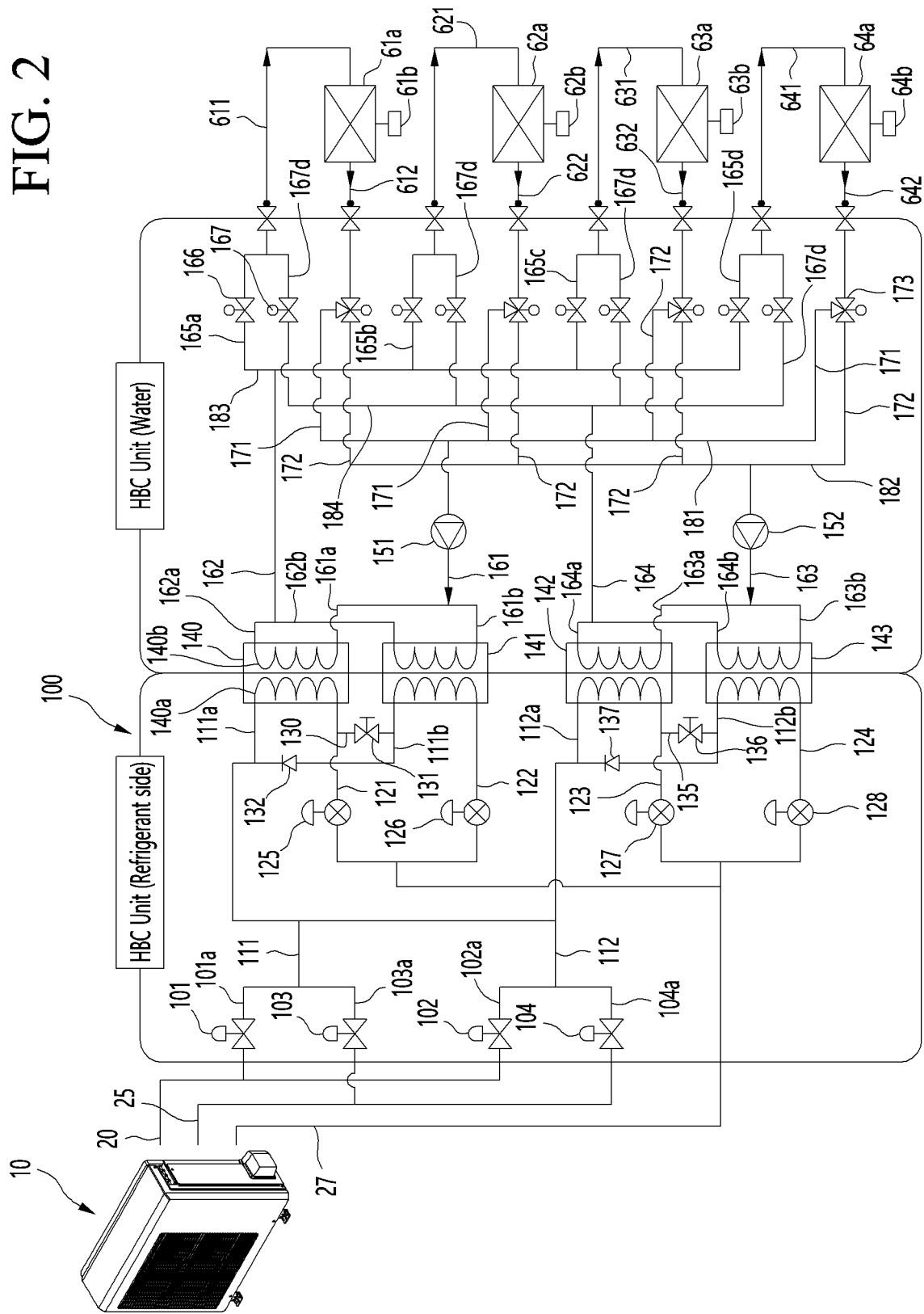
FIG. 2 is a cycle diagram showing an example configuration of an air conditioner according to some implementations of the present disclosure.

FIG. 1 is a perspective view showing an example configuration of an air conditioner according to some implementations of the present disclosure, and FIG. 2 is a cycle diagram showing an example configuration of an air conditioner according to some implementations of the present disclosure.

Referring to FIGS. 1 and 2, an air conditioner 1 according to some implementations of the present disclosure may include an outdoor unit 10, an indoor unit, and heat exchange devices 100 and 101 connected to the outdoor unit 10 and the indoor unit.

One, two, or more heat exchange devices 100 and 101 may be connected to the outdoor unit 10. In some implementations, a plurality of indoor units may be connected to one heat exchange device 100 or 101.

It is shown in FIG. 1 that, for example, two heat exchange devices 100 and 101 are connected to the outdoor unit 10, and four indoor units are connected to each of the heat exchange devices 100 and 101. For example, four indoor units 61, 62, 63, and 64 may be connected to a first heat exchange device 100, and four indoor units 65, 66, 67, and 68 may be connected to a second heat exchanger 101.

The outdoor unit 10 and the heat exchange devices 100 and 101 may be fluidly connected by a first fluid. As one example, the first fluid may include a refrigerant. The refrigerant may flow through a refrigerant flow path of a heat exchanger provided in the heat exchange devices 100 and 101 and the outdoor unit 10.

The outdoor unit 10 may include a compressor 11 and an outdoor heat exchanger 15.

An outdoor fan 16 is provided at one side of the outdoor heat exchanger 15 to blow outdoor air to the outdoor heat exchanger 15. Heat exchange between the outdoor air and the refrigerant of the outdoor heat exchanger 15 may be performed by driving the outdoor fan 16. The outdoor unit 10 may further include a main expansion valve 18.

The air conditioner 1 may further include connection pipes 20, 25 and 27 connecting the outdoor unit 10 to the heat exchange devices 100 and 101.

The connection pipes 20, 25 and 27 may include a first outdoor unit connection pipe 20 as a gas pipe (a high pressure gas pipe) through which high-pressure gaseous refrigerant flows, a second outdoor unit connection pipe 25 as a gas pipe (a low-pressure gas pipe) through which low-pressure gaseous refrigerant flows, and a third outdoor unit connection pipe 27 as a liquid pipe through which liquid refrigerant flows. For example, the outdoor unit 10 and the heat exchange devices 100 and 101 may have a "three-pipe connection structure", and the refrigerant may circulate through the outdoor unit 10 and the heat exchange devices 100 and 101 by the three connection pipes 20, 25, and 27.

The heat exchange devices 100 and 101 may be fluidly connected with the indoor unit by a second fluid. In one example, the second fluid may include water. Water may flow through a water flow path of the heat exchanger provided in the heat exchange devices 100 or 101 and the outdoor unit 10.

Each of the heat exchange devices 100 and 101 may include a plurality of heat exchangers 140, 141, 142, and 143. The heat exchanger may include, for example, a plate type heat exchanger.

The air conditioner 1 may further include pipes connecting the heat exchange device 100 and the indoor unit.

The pipes may include first, second, third, fourth, fifth, sixth, seventh, and eighth indoor unit connection pipes 30, 31, 32, 33, 30a, 30b, 30c and 30d which connect the heat exchangers 100 and 101 to the indoor units 61, 62, 63, 64, 65, 66, 67 and 68, respectively.

Water may circulate through the heat exchange devices 100 and 101 and the indoor unit through the indoor unit connection pipes 30, 31, 32, 33, 30a, 30b, 30c and 30d. When the number of indoor units increases, the number of pipes will increase to connect the heat exchangers 100 and 101 to the indoor units.

In the illustrated example, refrigerant circulating through the outdoor unit 10 and the heat exchange devices 100 and 101, and water circulating through the heat exchange devices 100 and 101 and the indoor unit may exchange heat through the heat exchangers 140, 141, 142 and 143 of the heat exchange devices 100 and 101.

Water cooled or heated through the heat exchange devices may heat or cool an indoor space by exchanging heat with indoor heat exchangers 61a, 62a, 63a and 64a provided in the indoor unit.

Hereinafter, an example structure of the first heat exchange device 100 will be primarily described, and an example structure of the second heat exchange device 101 is identical or similar to that of the first heat exchange device 100.

The first heat exchange device 100 may include first, second, third, and fourth heat exchangers 140, 141, 142 and 143 that are fluidly connected to the indoor units 61, 62, 63 and 64 respectively. The first, second, third, and fourth heat exchangers 140, 141, 142 and 143 may be formed in the same structure.

Each of the heat exchangers 140, 141, 142 and 143 may include, for example, a plate type heat exchanger, and may be configured such that water flow paths and refrigerant flow paths are alternately stacked. In some implementations, each of the heat exchangers 140, 141, 142 and 143 may include a refrigerant flow path 140a and a water flow path 140b.

The refrigerant flow paths 140a may be fluidly connected to the outdoor unit 10. The refrigerant that is discharged from the outdoor unit 10 may be introduced into the refrigerant flow paths 140a. In addition or alternatively, the refrigerant that has passed through the refrigerant flow paths 140a may be introduced into the outdoor unit 10.

The water flow paths 140b are connected to the indoor unit 61, 62, 63 and 64, respectively. Water that is discharged from the indoor units 61, 62, 63 and 64 may be introduced into the water flow paths 140b. In addition or alternatively, the water that has passed through the flow paths 140b may be introduced into the indoor units 61, 62, 63, and 64.

The heat exchange device 100 may include a first branch pipe 101a and a second branch pipe 102a branching from the first outdoor unit connection pipe 20. Valves 101 and 102 may be provided in the first branch pipe 101a and the second branch pipe 102a. In other implementations, a single branch pipe or more than two branch pipes may be provided that branch(es) from the first outdoor unit connection pipe 20.

The heat exchanger 100 may include a third branch pipe 103a and a fourth branch pipe 104a branching from the second outdoor unit connection pipe 25. Valves 103 and 104 may be provided in the third branch pipe 103a and the fourth branch pipe 104a. In other implementations, a single branch pipe or more than two branch pipes may be provided that branch(es) from the second outdoor unit connection pipe 25.

The first heat exchange device 100 may include a first common gas pipe 111 to which the first branch pipe 101a and the third branch pipe 103a are connected and a second common gas pipe 112 to which the second branch pipe 102a and the fourth branch pipe 104a are connected. The first common gas pipe 111 and the second common gas pipe 112 may communicate with each other.

The heat exchangers 140, 141, 142 or 143 may include a first refrigerant pipe 111a, 111b, 112a or 112b and a second refrigerant pipe 121, 122, 123 or 124 which communicate with the refrigerant flow path 140a.

The first refrigerant pipe 111a of the first heat exchanger 140 and the first refrigerant pipe 111b of the second heat exchanger 141 may communicate with the first common gas pipe 111.

A portion of the first common gas pipe 111, which is connected between the first refrigerant pipe 111a of the first heat exchanger 140 and the first refrigerant pipe 111b of the second heat exchanger 141, may be provided with a first check valve 132.

The first check valve 132 allows the refrigerant of the first refrigerant pipe 111b in the second heat exchanger 141 to flow toward the first refrigerant pipe 111a of the first heat exchanger 140. In addition or alternatively, the first check valve 132 blocks the refrigerant in the first refrigerant pipe 111a of the first heat exchanger 140 from flowing toward the first refrigerant pipe 111b of the second heat exchanger 141.

The first refrigerant pipe 112a of the third heat exchanger 142 and the first refrigerant pipe 112b of the fourth heat exchanger 143 may communicate with the second common gas pipe 112.

A portion of the second common gas pipe 112, which is connected between the first refrigerant pipe 112a of the third heat exchanger 142 and the first refrigerant pipe 112b of the fourth heat exchanger 143, maybe provided with a second check valve 137.

The second check valve 137 allows the refrigerant in the first refrigerant pipe 112b of the fourth heat exchanger 143 to flow toward the first refrigerant pipe 112a of the third heat exchanger 142. In addition or alternatively, the second check valve 137 blocks the refrigerant in the first refrigerant pipe 112a of the third heat exchanger 140 from flowing toward the first refrigerant pipe 112b of the fourth heat exchanger 143.

The second refrigerant pipes 121, 122, 123 and 124 may be connected to the third outdoor unit connection pipe 27.

The second refrigerant pipes 121, 122, 123 and 124 of the heat exchangers 140, 141, 142 and 143 may be provided with expansion valves 125, 126, 127 and 128 respectively. Each of the expansion valves 125, 126, 127 and 128 may include, for example, an electronic expansion valve (EEV). The electronic expansion valve may drop the pressure of refrigerant that passes through the expansion valve based on control of an opening degree. As one example, when the expansion valve is fully opened (in a full-open state), refrigerant may pass through without decompression, and when the opening degree of the expansion valve is reduced, the refrigerant may be decompressed. The degree of pressure reduction of the refrigerant increases as the opening degree decreases.

The second refrigerant pipe 121 of the first heat exchanger 140 and the first refrigerant pipe 111b of the second heat exchanger 141 may be connected by a first bypass pipe 130. The first bypass pipe 130 may be connected to a portion of the second refrigerant pipe 121 between the first expansion valve 125 and the refrigerant flow path 140a of the first heat exchanger 140. The first bypass pipe 130 may be provided with a first bypass valve 131.

The second refrigerant pipe 123 of the third heat exchanger 142 and the first refrigerant pipe 112b of the fourth heat exchanger 143 may be connected by a second bypass pipe 135. The second bypass pipe 135 may be connected to a portion of the second refrigerant pipe 123 between the third expansion valve 127 and the refrigerant flow path 140a of the third heat exchanger 142. The second bypass pipe 135 may be provided with a second bypass valve 136.

In some implementations, the heat exchange device 100 may include heat exchanger inlet pipes 161a, 161b, 163a and 163b and heat exchanger discharge pipes 162a, 162b, 164a and 164b, which are connected to the water flow paths 140b of the heat exchangers 140, 141, 142 and 143.

A first heat exchanger inlet pipe 161a of the first heat exchanger 140 and a second heat exchanger inlet pipe 161b of the second heat exchanger 141 may branch from a first common inlet pipe 161. The first common inlet pipe 161 may be provided with a first pump 151. A third heat exchanger inlet pipe 163a of the third heat exchanger 142 and a fourth heat exchanger inlet pipe 163b of the fourth heat exchanger 143 may branch from a second common inlet pipe 163. The second common inlet pipe 163 may be provided with a second pump 152.

A first heat exchanger discharge pipe 162a of the first heat exchanger 140 and a second heat exchanger discharge pipe 162b of the second heat exchanger 141 may branch from a first common discharge pipe 162. A third heat exchanger discharge pipe 164a of the third heat exchanger 142 and a fourth heat exchanger discharge pipe 164b of the fourth heat exchanger 143 may branch from the second common discharge pipe 164.

A first junction pipe 181 may be connected to the first common inlet pipe 161. A second junction pipe 182 may be connected to the second common inlet pipe 163. A third junction pipe 183 may be connected to the first common outlet pipe 162. A fourth junction pipe 184 may be connected to the second common outlet pipe 164.

A first water discharge pipe 171 through which water that is discharged from the indoor heat exchangers 61a, 62a, 63a and 64a flows may be connected to the first junction pipe 181. A second water discharge pipe 172 through which water that is discharged from the indoor heat exchangers 61a, 62a, 63a and 64a flows may be connected to the second junction pipe 182.

The first water discharge pipe 171 and the second water discharge pipe 172 may be disposed in parallel and connected to common water discharge pipes 612, 622, 632 and 642 that communicate with the indoor heat exchangers 61a, 62a, 63a and 64a.

The first water discharge pipe 171, the second water discharge pipe 172, and the common water discharge pipe 612, 622, 632 or 642 may be connected by, for example, a three-way valve 173. Therefore, the water of the common water discharge pipes 612, 622, 632, and 642 may flow into any one of the first water discharge pipe 171 and the second water discharge pipe 172 by the three-way valve 173.

First water inlet pipes 165a, 165b, 165c and 165d through which water to be introduced into the indoor heat exchangers 61a, 62a, 63a and 64a flows may be connected to the third junction pipe 183.

A second water inlet pipes 167d through which water to be introduced into the indoor heat exchangers 61a, 62a, 63a and 64a flows may be connected to the fourth junction pipe 184.

The first water inlet pipes 165a, 165b, 165c and 165d and the second water inlet pipe 167d may be disposed in parallel and connected to the common inlet pipes 611, 621, 631 and 641 that communicate with the indoor heat exchangers 61a, 62a, 63a and 64a.

Each of the first water inlet pipes 165a, 165b, 165c and 165d may be provided with a first valve 166 and the second water inlet pipe 167d may be provided with a second valve 167.

In some implementations, the indoor units 61 to 68 may include temperature sensors 61b, 62b, 63b and 64b for sensing the pipe temperature of an indoor unit, respectively.

Hereinafter, the flow of refrigerant and water in a heat exchange device during a cooling operation of an air conditioner will be described.

When the air conditioner 1 is operated in a cooling mode (e.g., when a plurality of indoor units are operated in a cooling mode), high-pressure liquid refrigerant condensed in an outdoor heat exchanger 15 of the outdoor unit 10 may flow through the third outdoor unit connection pipe 27 and be then distributed to the second refrigerant pipes 121, 122, 123 and 124.

In this case, since the expansion valves 125, 126, 127 and 128 provided in the second refrigerant pipes 121, 122, 123 and 124 may be opened at a predetermined opening degree, refrigerant may be decompressed to be low-pressure refrigerant by passing through the expansion valves 125, 126, 127 and 128. The decompressed refrigerant may be evaporated through heat exchange with water while flowing along the refrigerant flow paths of the heat exchangers 140, 141, 142 and 143.

During the cooling operation of the air conditioner 1, the bypass valves 131 and 136 are closed. Therefore, it is possible to prevent the refrigerant heat-exchanged by passing through the refrigerant flow path of the second heat exchanger 141 from flowing to the second refrigerant pipe 121 of the first heat exchanger 141 through the first bypass pipe 130. In addition, it is possible to prevent the refrigerant heat-exchanged by passing through the refrigerant flow path of the fourth heat exchanger 143 from flowing into the second refrigerant pipe 123 of the third heat exchanger 142 through the second bypass pipe 135.

The refrigerant flowing through the refrigerant flow paths of the first and second heat exchangers 140 and 141 may flow into the first common gas pipe 111 after passing through the first and second refrigerant pipes 111a and 111b. The refrigerant that has flowed into the first common gas pipe 111 flows into the second outdoor unit connection pipe 25 by the third branch pipe 103a.

The refrigerant flowing through the refrigerant flow paths of the third and fourth heat exchangers 142 and 143 may flow into the second common gas pipe 112 after passing through the first and second refrigerant pipes 112a and 112b. The refrigerant that has flowed into the second common gas pipe 112 flows into the second outdoor unit connection pipe 25 by the fourth branch pipe 104a.

The valves 101 and 102 of the first branch pipe 101a and the second branch pipe 102a are closed and the valves 103 and 104 of the third branch pipe 103a and the fourth branch pipe 104a are opened when the air conditioner 1 is being operated in a cooling mode, The refrigerant discharged to the second outdoor unit connection pipe 25 may be introduced into the outdoor unit 10 and may be suctioned into the compressor 11. The high-pressure refrigerant compressed in the compressor 11 is condensed in the outdoor heat exchanger 15, and the condensed liquid refrigerant may flow along the third outdoor unit connection pipe 27 again.

As such, during the cooling operation of the air conditioner 1, the heat exchangers 140, 141, 142 and 143 function as an "evaporator" for evaporating abnormal low-pressure refrigerant.

In some implementations, the water that flows through the water flow paths 140b of the heat exchangers 140, 141, 142 and 143 is cooled by heat exchange with the refrigerant, and the cooled water (referred to as "low temperature water") is supplied to the heat exchangers 61a, 62a, 63a and 64a to perform cooling.

In these implementations, the water discharged to the first common discharge pipe 162 may flow into the first indoor heat exchanger 61a and the second indoor heat exchanger 62a. Further, the water discharged to the second common discharge pipe 164 may flow into the third indoor heat exchanger 63a and the second indoor heat exchanger 64a.

For example, the water discharged to the first common discharge pipe 162 flows into the first indoor heat exchanger 61a and the second indoor heat exchanger 62a through the first water inlet pipes 165a and 165b. Further, the water discharged to the second common discharge pipe 164 may flow into the third indoor heat exchanger 63a and the fourth indoor heat exchanger 64a through the second water inlet pipe 167d.

The water flowing through the indoor heat exchangers 61a, 62a, 63a and 64a may be heat-exchanged with indoor air that is blown into the indoor heat exchanger. Since water heat-exchanged with refrigerant in the heat exchangers 140, 141, 142 or 143 is in a low temperature state, indoor air is cooled to enable indoor cooling when the water and the indoor air are heat-exchanged while the water is flowing through the indoor heat exchangers 61a, 62a, 63a and 64a.

In these implementations, the water that flows through the first and second indoor heat exchangers 61a and 62a may flow toward the first common inlet pipe 161. For example, the water that has flowed through the first and second indoor heat exchangers 61a and 62a may flow into the first common inlet pipe 161 after flowing along the first water discharge pipe 171.

Further, the water that has flowed through the third and fourth indoor heat exchangers 63a and 64a may flow toward the second common inlet pipe 163. For example, the water that has flowed through the third and fourth indoor heat exchangers 63a and 64a may flow through the second water discharge pipe 172 and then into the second common inlet pipe 163.

In some implementations, when the air conditioner 1 is operated in a heating mode (e.g., when a plurality of indoor units are operated in a heating mode), the high-pressure gaseous refrigerant that is compressed in the compressor 11 of the outdoor unit 10 flows through the first outdoor unit connection pipe 20 and is then distributed to the first branch pipe 101a and the second branch pipe 101b.

During the heating operation of the air conditioner 1, the valves 101 and 102 of the first and second branch pipes 101a and 101b are opened, and the valves 103 and 104 of the third and fourth branch pipes 103a and 104a are closed.

The refrigerant that is distributed to the first branch pipe 101a flows along the first common gas pipe 111 and then flows to the first refrigerant pipe 111a of the first heat exchanger 140. In addition, the refrigerant that is distributed to the second branch pipe 101b flows along the second common gas pipe 112 and then flows to the first refrigerant pipe 112a of the third heat exchanger 142.

During the heating operation of the air conditioner 1, the first expansion valve 121 and the third expansion valve 123 are closed, and the second expansion valve 122 and the fourth expansion valve 124 are opened at a predetermined opening degree. In addition, during the heating operation of the air conditioner 1, the bypass valves 131 and 132 may be opened.

Therefore, the refrigerant that has flowed into the first refrigerant pipe 111a of the first heat exchanger 140 is discharged to the second refrigerant pipe 121 after being heat-exchanged with water by passing through the first heat exchanger 140.

Since the first expansion valve 125 is closed and the first bypass valve 131 is opened, the refrigerant that is discharged to the second refrigerant pipe 121 flows to the first refrigerant pipe 111b of the second heat exchanger 141 by the first bypass pipe 130.

The refrigerant that has flowed into the second refrigerant pipe 111b of the second heat exchanger 141 is discharged to the second refrigerant pipe 122 after being heat-exchanged with water by passing through the first heat exchanger 140.

The refrigerant that is discharged to the second refrigerant pipe 122 flows to the third outdoor unit connection pipe 27 after passing through the second expansion valve 126.

In addition, the refrigerant that has flowed into the first refrigerant pipe 112a of the third heat exchanger 142 is discharged to the second refrigerant pipe 123 after being heat-exchanged with water by passing through the third heat exchanger 142.

Since the third expansion valve 127 is closed and the second bypass valve 136 is opened, the refrigerant discharged to the second refrigerant pipe 123 flows to the first refrigerant pipe 112b of the fourth heat exchanger 143 by the second bypass pipe 135.

The refrigerant that flows into the first refrigerant pipe 112b of the fourth heat exchanger 143 is discharged to the second refrigerant pipe 124 after being heat-exchanged with water by passing through the fourth heat exchanger 143.

The refrigerant that is discharged to the second refrigerant pipe 124 flows to the third outdoor unit connection pipe 27 after passing through the fourth expansion valve 128.

In some implementations, when the air conditioner 1 is operated in a heating mode, water flowing through the water flow paths 140b of the heat exchangers 140, 141, 142 and 143 is heated by heat exchange with refrigerant, and the heated water (referred to as "high temperature water") is supplied to the indoor heat exchangers 61a, 62a, 63a and 64a to perform heating.

As such, during the heating operation of the air conditioner 1, the heat exchangers 140, 141, 142 and 143 function as a "condenser" for condensing high-pressure gaseous refrigerant.

Hereinafter, a pipe search method for a pipe in an air conditioner will be described. Pipe searching can mean identifying which indoor unit is connected to one or more of a plurality of ports of a heat exchanger.

Figure 4:
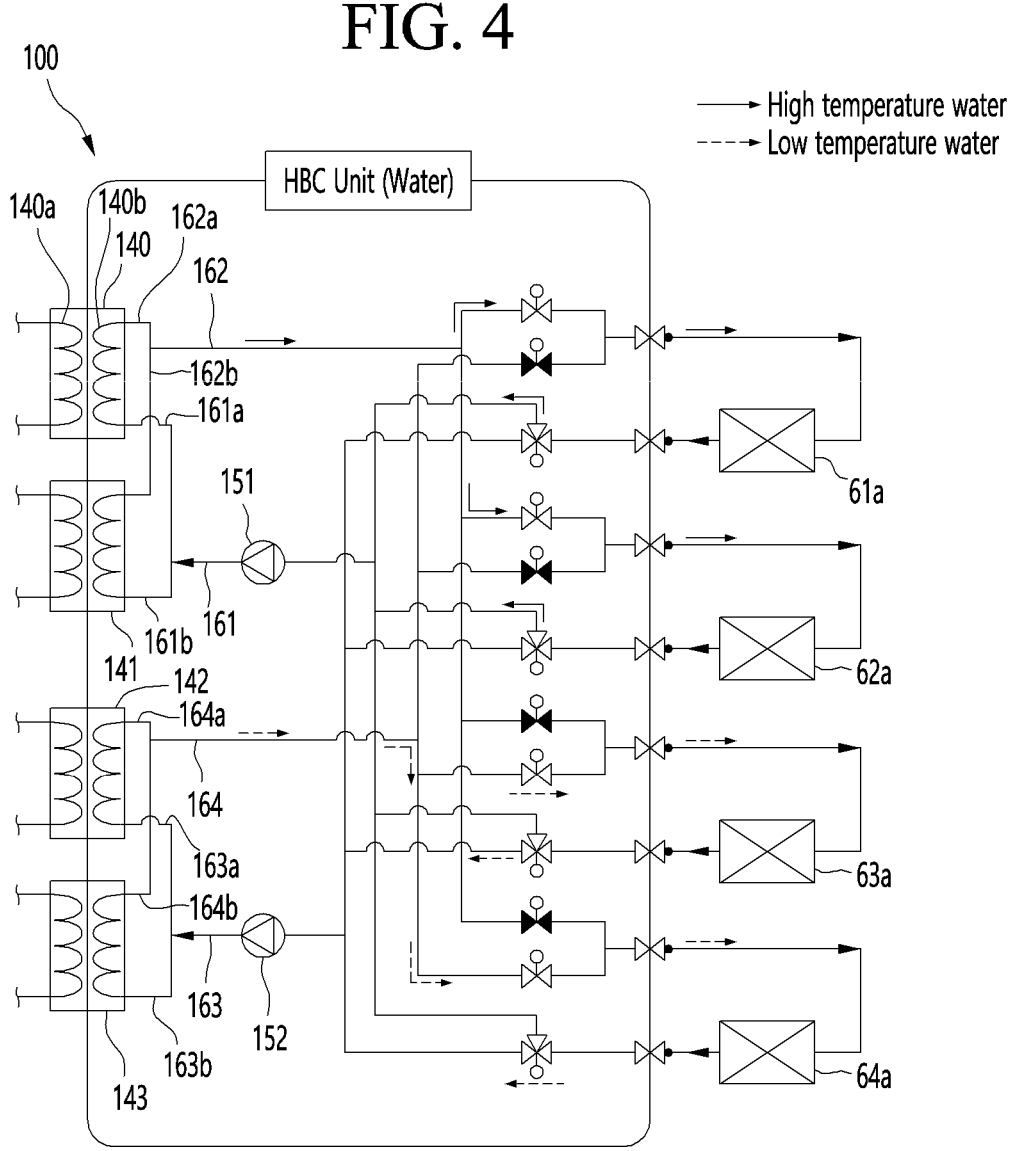
FIGS. 4 and 5 are cycle diagrams showing example flow of water when the indoor temperature is higher than or equal to the reference temperature.
Figure 5:
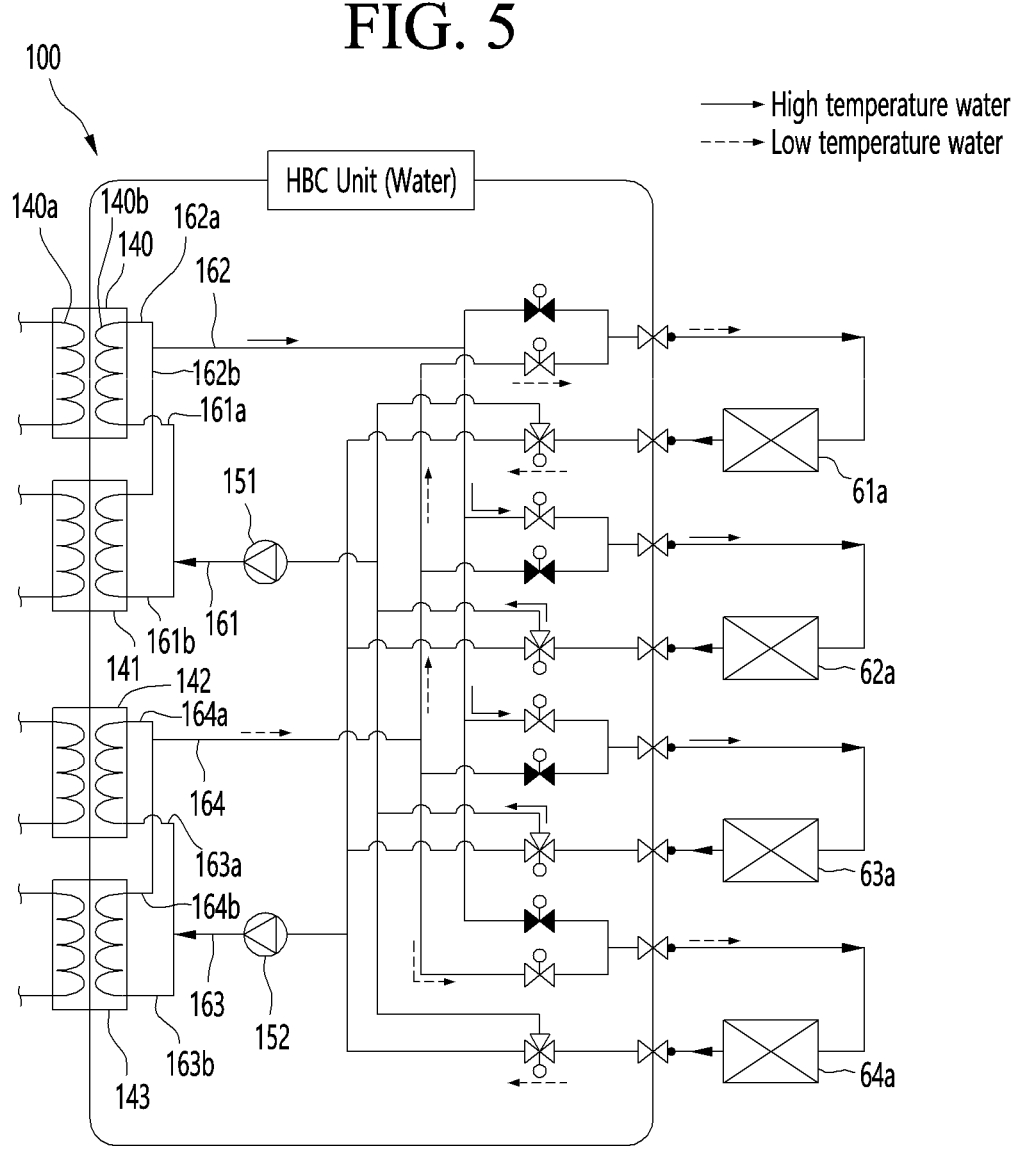
Figure 6:
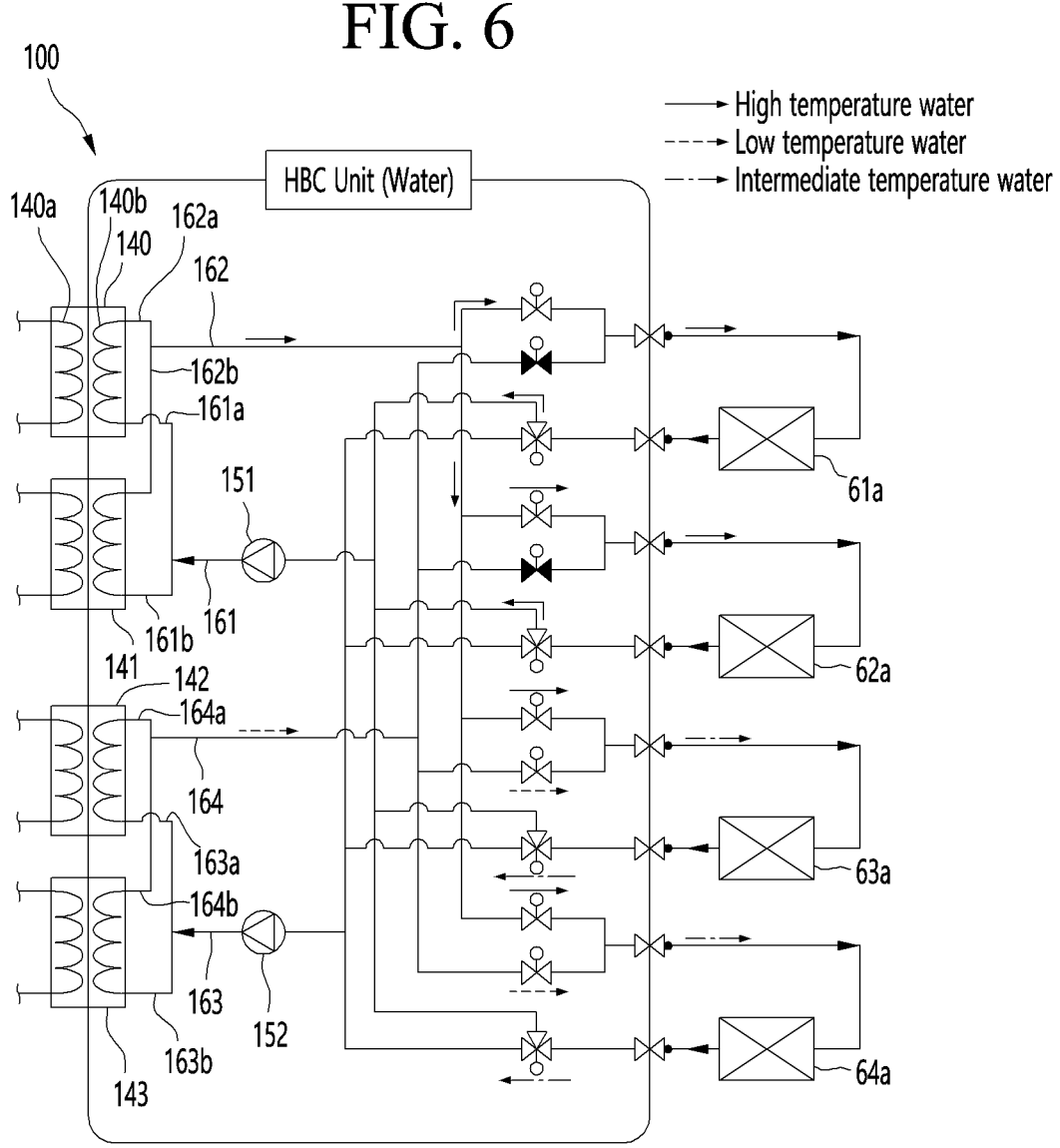
FIGS. 6 and 7 are cycle diagrams showing example flow of water when the indoor temperature is less than the reference temperature.
Figure 7:
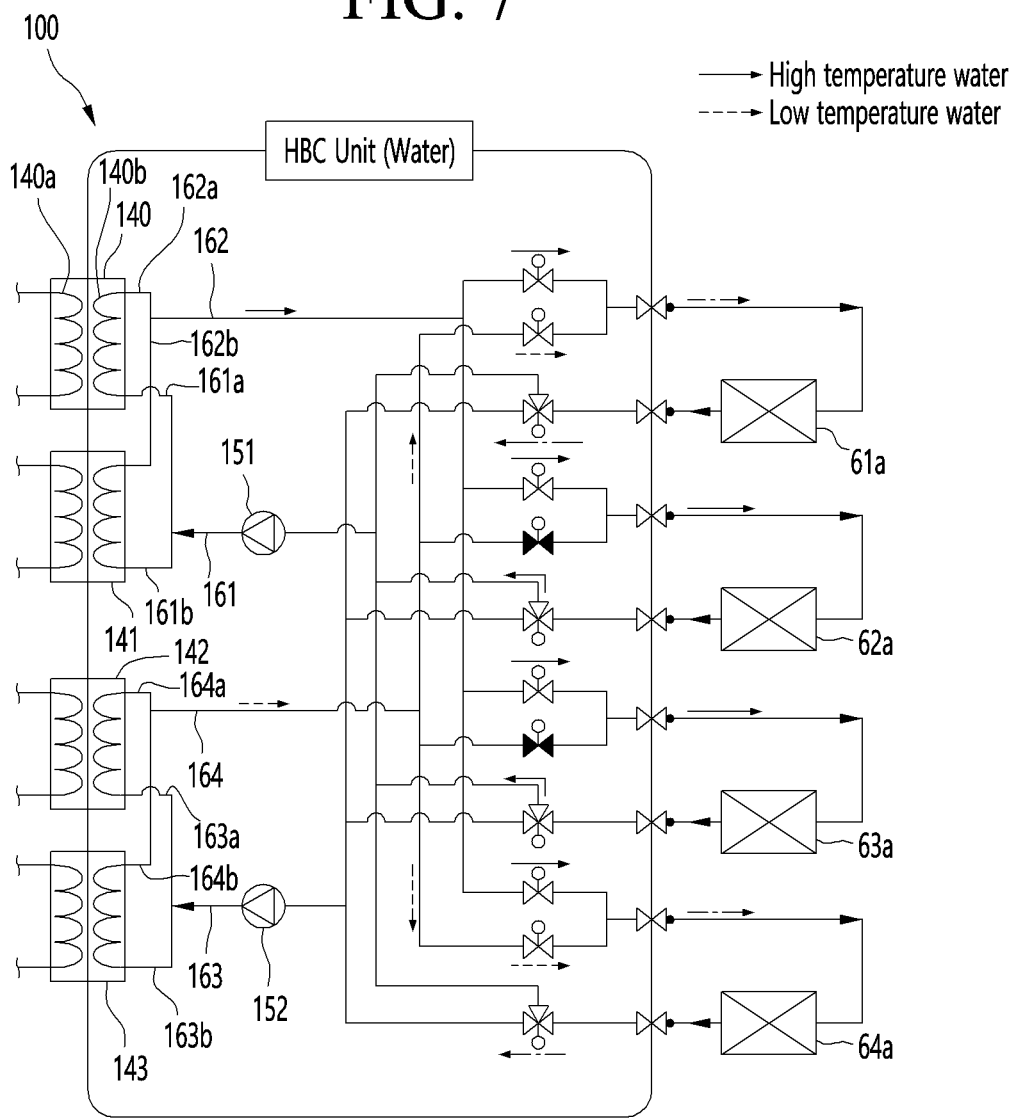

FIG. 3 is a diagram showing example temperatures of water flowing to each indoor unit for each number of times of pipe searching. FIG. 3(a) shows the temperature of water flowing into each indoor unit when an indoor temperature is higher than or equal to a reference temperature, and FIG. 3(b) shows the temperature of water flowing into each indoor unit when the indoor temperature is less than the reference temperature. FIGS. 4 and 5 are cycle diagrams showing example flow of water when the indoor temperature is higher than or equal to the reference temperature, and FIGS. 6 and 7 are cycle diagrams showing example flow of water when the indoor temperature is less than the reference temperature.

Referring to FIGS. 2 to 7, a pipe search method in the first heat exchange device 100 of the plurality of heat exchange devices 100 and 101 is described.

When the indoor temperature is higher than or equal to the reference temperature, high temperature water (e.g., water at a first temperature) may flow to some of the indoor units connected to the first heat exchanger 100 and low temperature water (e.g., water at a second temperature) may flow to some other indoor units in order for pipe searching of the first heat exchanger 100. The second temperature is lower than the first temperature.

For convenience of description, it is assumed that the pipes 30 to 34 of the first, second, third, and fourth indoor units 61 to 64 are sequentially connected to the first, second, third, and fourth ports of the first heat exchange device 100, respectively.

In some implementations, a controller 70 controls the valves 166 and 167 to allow the high temperature water to flow to the first port and the second port and allow the low temperature water to flow to the third port and the fourth port. The controller 70 may control the flow of water between the heat exchange devices 100 and 101 and the indoor units. In some examples, the controller 70 may include an electric circuit, an integrated circuit, a processor, or the like.

The high temperature water can flow to the indoor units that is connected to the first port and the second port. The low temperature water can flow to the indoor units that is connected to the third port and the fourth port. In this case, to allow the high temperature water to flow to the indoor unit, the first valve 166 may be opened and the second valve 167 may be closed. Therefore, the high temperature water may flow to the indoor units through the first water inlet pipes 165a and 165b. In order to allow the low temperature water to flow to the indoor unit, the second valve 167 may be opened, and the first valve 166 may be closed. Therefore, the low temperature water may flow to the indoor units through the second water inlet pipe 167d.

For example, referring to FIG. 4, the high temperature water may flow to the first indoor unit 61 and the second indoor unit 62 connected to the first port and the second port, and the low temperature water may flow to the third indoor unit 63 and the fourth indoor unit 64 connected to the third port and the fourth port (e.g., a first time of search).

To allow high temperature water to flow to some indoor units, the first heat exchanger 140 and the second heat exchanger 141 may function as a condenser. To allow low temperature water to flow to the other indoor units, the third heat exchanger 142 and the fourth heat exchanger 143 may function as an evaporator.

As described above, when the high temperature water flows to some indoor units and low temperature water flows to the other indoor units, ports may be divided into two groups.

In the case of an indoor unit through which high temperature water flows, a pipe temperature increases. In the case of an indoor unit through which low temperature water flows, a pipe temperature decreases. Therefore, the indoor unit in which the pipe temperature increases and the indoor unit in which the pipe temperature decreases may be distinguished from each other and be grouped together with the port.

For example, the first indoor unit 61, the second indoor unit 62, and ports connected to the first and second indoor units 61 and 62 can be grouped into a first group, and the third indoor unit 63, the fourth indoor unit 64, and ports connected to the third and fourth indoor units 63 and 64 can be grouped into a second group.

The controller 70 controls the valves 166 and 167 to allow low temperature water to flow to one of the first port and the second port, and allow high temperature water to flow to one of the third port and the fourth port. As an example, the low temperature water may be allowed to flow to the first port, and the high temperature water may be allowed to flow to the second port. In addition, the high temperature water may be allowed to the third port and the low temperature water may be allowed to the fourth port.

Then, as shown in FIG. 5, the low temperature water flows to the first indoor unit 61 connected to the first port, and the high temperature water flows to the third indoor unit 63 connected to the third port (e.g., a second time of search).

The controller 70 can search for an indoor unit (which is a first indoor unit) through which the low temperature water flows from the first group and matches the indoor unit with the first port. Then, the indoor unit (which is a second indoor unit) of the first group, through which the high temperature water flows, may be automatically matched with the second port.

In addition, the controller 70 can search an indoor unit (which is a third indoor unit) through which the high temperature water flows from the second group and matches the indoor unit with the third port. Then, the indoor unit (which is the fourth indoor unit) of the second group, through which the low temperature water flows, may be automatically matched with the fourth port.

In some implementations, information on the pipes that have been matched to the ports may be stored in a memory.

Therefore, according to the present disclosure, it is possible to search for a pipe that is connected to a port of the heat exchanger device accurately with a minimum number of times of search.

When the pipe search of the first heat exchanger 100 is completed, the pipe search of the second heat exchanger 101 may be performed by the same method.

When the low temperature water flows into the indoor unit when the indoor temperature is less than the reference temperature, the temperature of the pipe and the indoor temperature become similar to each other, so that a change in the temperature of the pipe may not be detected, leading to failure in grouping of indoor units.

Therefore, in some implementations of the present disclosure, when the indoor temperature is less to the reference temperature, high temperature water may flow to some of the indoor units connected to the first heat exchanger 100, and intermediate temperature water (water at a third temperature between a first temperature and a second temperature) may flow to the others of the indoor units in order for pipe searching of the first heat exchanger 100. In some examples, the reference temperature may be approximately 10 degrees Celsius. Other reference temperatures are possible in other examples.

In some implementations, the intermediate temperature water corresponds to an intermediate temperature between the temperature of the high temperature water and the temperature of the low temperature water. For example, the high temperature water and the low temperature water may be mixed so that intermediate temperature water occurs.

For example, the controller 70 controls the valves 166 and 167 to allow the high temperature water to flow to the first port and the second port and allow intermediate temperature water to flow to the third port and the fourth port.

Then, the high temperature water flows to the indoor units connected to the first port and the second port, and the intermediate temperature water flows to the indoor units connected to the third port and the fourth port. In this case, to allow the high temperature water to flow to the indoor unit, the first valve 166 may be opened and the second valve 167 may be closed. Therefore, the high temperature water may flow to the indoor units through the first water inlet pipes 165a, 165b, 165c, and 165d. Further, to allow the intermediate temperature water to flow to the indoor unit, the first valve 166 and the second valve 167 may be opened. Therefore, the high temperature water flows through the first water inlet pipes 165a, 165b, 165c and 165d and the low temperature water flows through the second water inlet pipe 167d, so that finally, the intermediate temperature water, which result from mixing the high temperature water with the low temperature water, may flow into the indoor unit.

For example, referring to FIG. 6, the high temperature water may flow to the first indoor unit 61 and the second indoor unit 62 that are connected to the first port and the second port, and the intermediate temperature water may flow to the third indoor unit 63 and the fourth indoor unit 64 that are connected to the third port and the fourth port (e.g., a first time of search).

To allow high temperature water to flow to some indoor units, the first heat exchanger 140 and the second heat exchanger 141 may function as a condenser. To allow the intermediate temperature water to flow to some other indoor units, the third heat exchanger 142 and the fourth heat exchanger 143 may function as an evaporator.

As described above, when the intermediate temperature water flows to some indoor units and the low temperature water flows to the other indoor units, ports may be divided into two groups.

Since the temperature of a pipe that is detected by the temperature sensor of an indoor unit through which high temperature water flows, is higher than the temperature of a pipe that is detected by the temperature sensor of an indoor unit through which intermediate temperature water flows, indoor units may be grouped based on a temperature difference detected by the temperature sensors.

In the case of an indoor unit through which high temperature water flows, the temperature of a pipe may increase above a first reference value. In the case of an indoor unit through which intermediate temperature water flows, the temperature of a pipe may increase above a second reference value smaller than the first reference value.

In some implementations, the controller 70 may group ports based on the degree of change or difference in the temperature of the pipe.

For example, the first indoor unit 61 and the second indoor unit 62, through which high temperature water flows, and ports connected to the first and second indoor units 61 and 62, may be grouped into a first group. The third indoor unit 63 and the fourth indoor unit 64, through which intermediate temperature water flows, and ports connected to the third and fourth indoor units 63 and 64 may be grouped into a second group.

The controller 70 controls the valves 166 and 167 to allow intermediate temperature water to flow to one of the first port and the second port, and allow high temperature water to flow to one of the third port and the fourth port.

For example, the intermediate temperature water may be allowed to flow to the first port, and the high temperature water may be allowed to flow to the second port. In addition, the intermediate temperature water may be allowed to the third port and the low temperature water may be allowed to the fourth port.

Then, as shown in FIG. 7, the intermediate temperature water flows to the first indoor unit 61 connected to the first port, and the high temperature water flows to the third indoor unit 63 connected to the third port (e.g., a second time of search).

The controller 70 can search for an indoor unit (which is a first indoor unit) through which the intermediate temperature water flows from the first group and matches the indoor unit with the first port. Then, the indoor unit (which is a second indoor unit) of the first group, through which the high temperature water flows, may be automatically matched with the second port.

In addition, the controller 70 can search for an indoor unit (which is a third indoor unit) through which the high temperature water flows from the second group and matches the indoor unit to the third port. Then, the indoor unit (which is the fourth indoor unit) of the second group, through which the intermediate temperature water flows may be automatically matched to the fourth port.

In some implementations, since the temperature of the pipe that is detected by the indoor unit through which the intermediate temperature water flows is higher than the indoor temperature, the difference in the temperature of the pipe becomes more than a certain level, thereby enabling grouping of indoor units when the intermediate temperature water flows into the indoor unit in a state where the indoor temperature is low.

Therefore, according to the present disclosure, it is possible to search for a pipe connected to a port of the heat exchanger device accurately with a minimum number of times of search. As described herein, in the case where the indoor temperature is low, it is possible to perform pipe search accurately without a search error by allowing the intermediate temperature water to flow into the indoor unit instead of low temperature water.

When the pipe search of the first heat exchanger 100 is completed, the pipe search of the second heat exchanger 101 may be performed by the same method.

What is claimed is:

1. An air conditioner comprising:
   an outdoor unit configured to circulate refrigerant;
   a plurality of indoor units configured to circulate fluid;
   a heat exchanger that fluidly connects the outdoor unit to the plurality of indoor units and is configured to transfer heat between the refrigerant and the fluid, the heat exchanger including a plurality of ports that fluidly connect to the plurality of indoor units through a plurality of pipes; and
   a controller configured to control flow of the fluid between the heat exchanger and the plurality of indoor units,
   wherein the controller is configured to:
   permit the fluid that is at a first temperature to flow to a first subset of the plurality of ports, permit the fluid that is at a second temperature to flow to a second subset of the plurality of ports, the second temperature being lower than the first temperature, and identify fluidic connection between at least one of the plurality of pipes and at least one of the plurality of ports based on the flow of the fluid that is at the first temperature and the flow of the fluid that is at the second temperature, wherein the controller is configured to, based on an indoor temperature being higher than or equal to a reference temperature, permit the fluid that is at the first temperature to flow to the first subset of the plurality of ports and permit the fluid that is at the second temperature to the second subset of the plurality of ports, and wherein the controller is configured to, based on the indoor temperature being lower than the reference temperature, permit the fluid that is at the first temperature flows to the first subset of the plurality of ports and permit the fluid that is at a third temperature to the second subset of the plurality of ports, the third temperature being between the first temperature and the second temperature.

2. The air conditioner of claim 1, wherein the controller is configured to classify at least some of the plurality of ports to a first group of ports and a second group of ports, wherein the fluid that is at the first temperature flows through the first group of ports, and wherein the fluid that is at the second temperature flows through the second group of ports.

3. The air conditioner of claim 2, wherein the controller is configured to permit the fluid that is at the first temperature to flow to a first subset of the first group of ports, and permit the fluid that is at the second temperature to flow to a second subset of the first group of ports.

4. The air conditioner of claim 3, wherein the controller is configured to match first and second ports in the first group of ports with first and second indoor units by distinguishing the first port from the second port, wherein the fluid that is at the first temperature flows through the first port, and the fluid that is at the second temperature flows through the second port.

5. The air conditioner of claim 2, wherein the controller is configured to permit the fluid that is at the first temperature to flow to a first subset of the second group of ports, and permit the fluid that is at the second temperature to flow to a second subset of the second group of ports.

6. The air conditioner of claim 5, wherein the controller is configured to match third and fourth ports in the second group of ports with third and fourth indoor units by distinguishing the third port from the fourth port, wherein the fluid that is at the first temperature flows through the third port, and the fluid that is at the second temperature flows through the fourth port.

7. The air conditioner of claim 1, wherein the controller is configured to classify at least some of the plurality of ports to a first group of ports and a second group of ports, wherein the fluid that is at the first temperature flows through the first group of ports, and wherein the fluid that is at the third temperature flows through the second group of ports.

8. The air conditioner of claim 7, wherein the controller is configured to permit the fluid that is at the first temperature to flow to a first subset of the first group of ports, and permit the fluid that is at the third temperature to flow to a second subset of the first group of ports.

9. The air conditioner of claim 8, wherein the controller is configured to match first and second ports in the first group of ports with first and second indoor units by distinguishing the first port from the second port, wherein the fluid that is at the first temperature flows through the first port, and the fluid that is at the third temperature flows through the second port.

10. The air conditioner of claim 7, wherein the controller is configured to permit the fluid that is at the first temperature to flow to a first subset of the second group of ports, and permit the fluid that is at the third temperature to flow to a second subset of the second group of ports.

11. The air conditioner of claim 10, wherein the controller is configured to match third and fourth ports in the second group of ports with third and fourth indoor units by distinguishing the third port from the fourth port, wherein the fluid that is at the first temperature flows through the third port, and the fluid that is at the third temperature flows through the fourth port.

12. The air conditioner of claim 1, wherein the heat exchanger includes:
a first fluid inlet pipe and a second fluid inlet pipe that allow the fluid to flow into each indoor unit,
a first valve configured to control fluid flow in the first fluid inlet pipe, and
a second valve configured to control fluid flow in the second fluid inlet pipe,
wherein the controller is configured to:
open the first valve and close the second valve to permit the fluid that is at the first temperature to flow into the indoor unit,
open the second valve and close the first valve to permit the fluid that is at the second temperature to flow into the indoor unit, and
open the first valve and the second valve to permit the fluid that is at the third temperature to flow into the indoor unit.

13. A pipe search method for an air conditioner, wherein the air conditioner comprises:
an outdoor unit configured to circulate refrigerant,
a plurality of indoor units configured to circulate fluid,
a heat exchanger that fluidly connects the outdoor unit to the plurality of indoor units and is configured to transfer heat between the refrigerant and the fluid, the heat exchanger including a plurality of ports that fluidly connect to the plurality of indoor units through a plurality of pipes, and
a controller configured to control flow of the fluid between the heat exchanger and the plurality of indoor units,
the pipe search method comprising:
allowing the fluid that is at a first temperature to flow into a first subset of the plurality of ports;
allowing the fluid that is at a second temperature lower than the first temperature to flow into a second subset of the plurality of ports;
classifying at least some of the plurality of ports to a first group of ports and a second group of ports, wherein the fluid that is at the first temperature flows through the first group of ports, and wherein the fluid that is at the second temperature flows through the second group of ports;
allowing the fluid that is at the first temperature to flow into a first subset of the first group of ports;
allowing the fluid that is at the second temperature to flow into a second subset of the first group of ports;
allowing the fluid that is at the first temperature to flow into a first subset of the second group of ports; and allowing the fluid that is at the second temperature to flow into a second subset of the second group of ports.

14. The pipe search method of claim 13, wherein the controller is configured to match first and second ports in the first group of ports with first and second door units by distinguishing the first port from the second port, wherein the fluid that is at the first temperature flows through the first port, and the fluid that is at the second temperature flows through the second port, and wherein the controller is configured to match third and fourth ports in the second group of ports with third and fourth door units by distinguishing the third port from the fourth port, wherein the fluid that is at the first temperature flows through the third port, and the fluid that is at the second temperature flows through the fourth port.

15. A pipe search method for an air conditioner, wherein the air conditioner comprises:
an outdoor unit configured to circulate refrigerant,
a plurality of indoor units configured to circulate fluid,
a heat exchanger that fluidly connects the outdoor unit to the plurality of indoor units and is configured to transfer heat between the refrigerant and the fluid, the heat exchanger including a plurality of ports that fluidly connect to the plurality of indoor units through a plurality of pipes, and
a controller configured to control flow of the fluid between the heat exchanger and the plurality of indoor units,
the pipe search method comprising:
detecting an indoor temperature;
based on the indoor temperature being higher than or equal to a reference temperature, allowing the fluid that is at a first temperature to flow into a first subset of the plurality of ports, and allowing the fluid that is at a second temperature lower than the first temperature flows into a second subset of the plurality of ports; and
based on the indoor temperature being lower than the reference temperature, allowing the fluid that is at the first temperature to flow into a third subset of the plurality of ports and allowing the fluid that is at a third temperature to flow into a fourth subset of the plurality of ports, the third temperature being between the first temperature and the second temperature.

16. The pipe search method of claim 15, wherein the controller is configured to classify at least some of the plurality of ports to a first group of ports and a second group of ports, wherein the fluid that is at the first temperature flows through the first group of ports, and wherein the fluid that is at the third temperature flows through the second group of ports, and wherein the controller is configured to:
permit the fluid that is at the first temperature to flow into a first subset of the first group of ports;
permit the fluid that is at the third temperature to flow into a second subset of the first group of ports;
permit the fluid that is at the first temperature to flow into a first subset of the second group of ports; and
permit the fluid that is at the third temperature to flow into a second subset of the second group of ports.

17. The pipe search method of claim 16, wherein the controller is configured to match first and second ports in the first group of ports with first and second indoor units by distinguishing the first port from the second port, wherein the fluid that is at the first temperature flows through the first port, and the fluid that is at the third temperature flows through the second port, and wherein the controller is configured to match third and fourth ports in the second group of ports with third and fourth indoor units by distinguishing the third port from the fourth port, wherein the fluid that is at the first temperature flows through the third port, and the fluid that is at the third temperature flows through the fourth port.

18. The pipe search method of claim 15, wherein the controller is configured to classify at least some of the plurality of ports to a first group of ports and a second group of ports, wherein the fluid that is at the first temperature flows through the first group of ports, and wherein the fluid that is at the second temperature flows through the second group of ports, and wherein the controller is configured to:
permit the fluid that is at the first temperature flows into a first subset of the first group of ports;
permit the fluid that is at the second temperature flows into a second subset of the first group of ports;
permit the fluid that is at the first temperature flows into a first subset of the second group of ports; and
permit the fluid that is at the second temperature flows into a second subset of the second group of ports.

19. The pipe search method of claim 18, wherein the controller is configured to match first and second ports in the first group of ports with first and second indoor units by distinguishing the first port from the second port, wherein the fluid that is at the first temperature flows through the first port, and the fluid that is at the second temperature flows through the second port, and wherein the controller is configured to match third and fourth ports in the second group of ports with third and fourth indoor units, wherein the fluid that is at the first temperature flows through the third port, and the fluid that is at the second temperature flows through the fourth port.

* * * * *